M. H. JESTER.
SUPPORTING DEVICE FOR PLASTER BOARDS USED IN PARTITION CONSTRUCTION.
APPLICATION FILED NOV. 15, 1912.
1,076,766.
Patented Oct. 28, 1913.
3 SHEETS—SHEET 1.
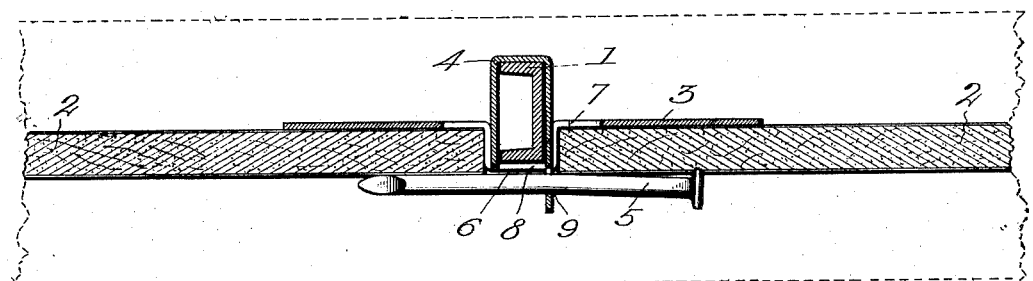
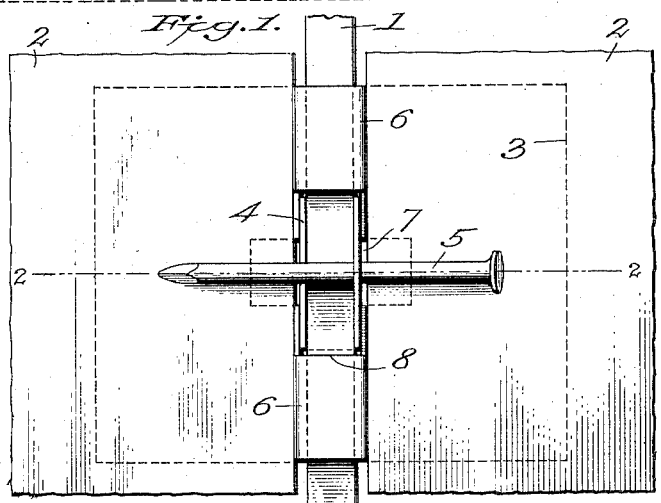
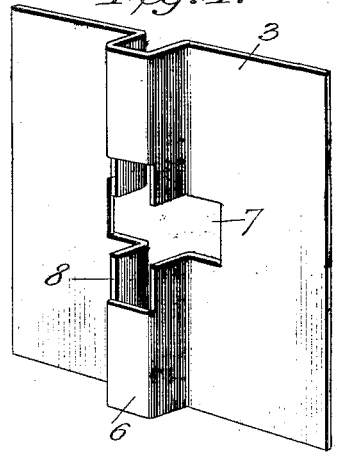
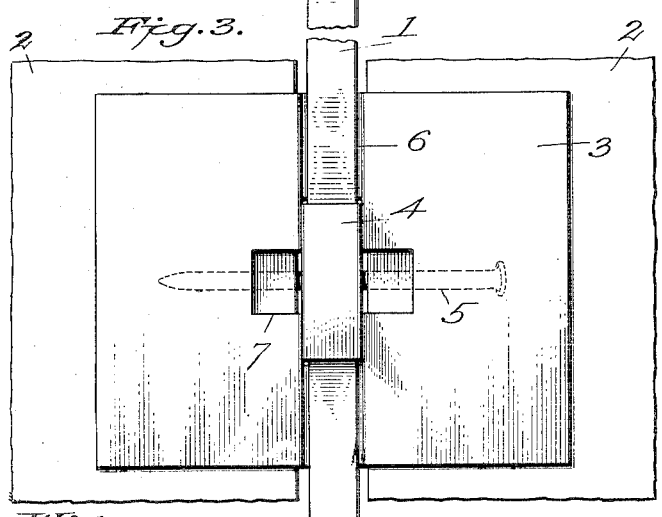
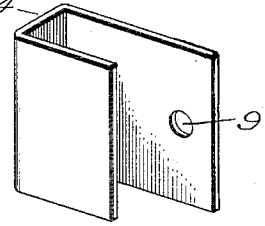
Witnesses:
G. Sargent Elliott.
Adella M. Fowle
Inventor:
Marvin H. Jester
By H. S. Bailey
Attorney M. H. JESTER.
SUPPORTING DEVICE FOR PLASTER BOARDS USED IN PARTITION CONSTRUCTION.
APPLICATION FILED NOV. 15, 1912.
1,076,766.
Patented Oct. 28, 1913.
3 SHEETS—SHEET 2.
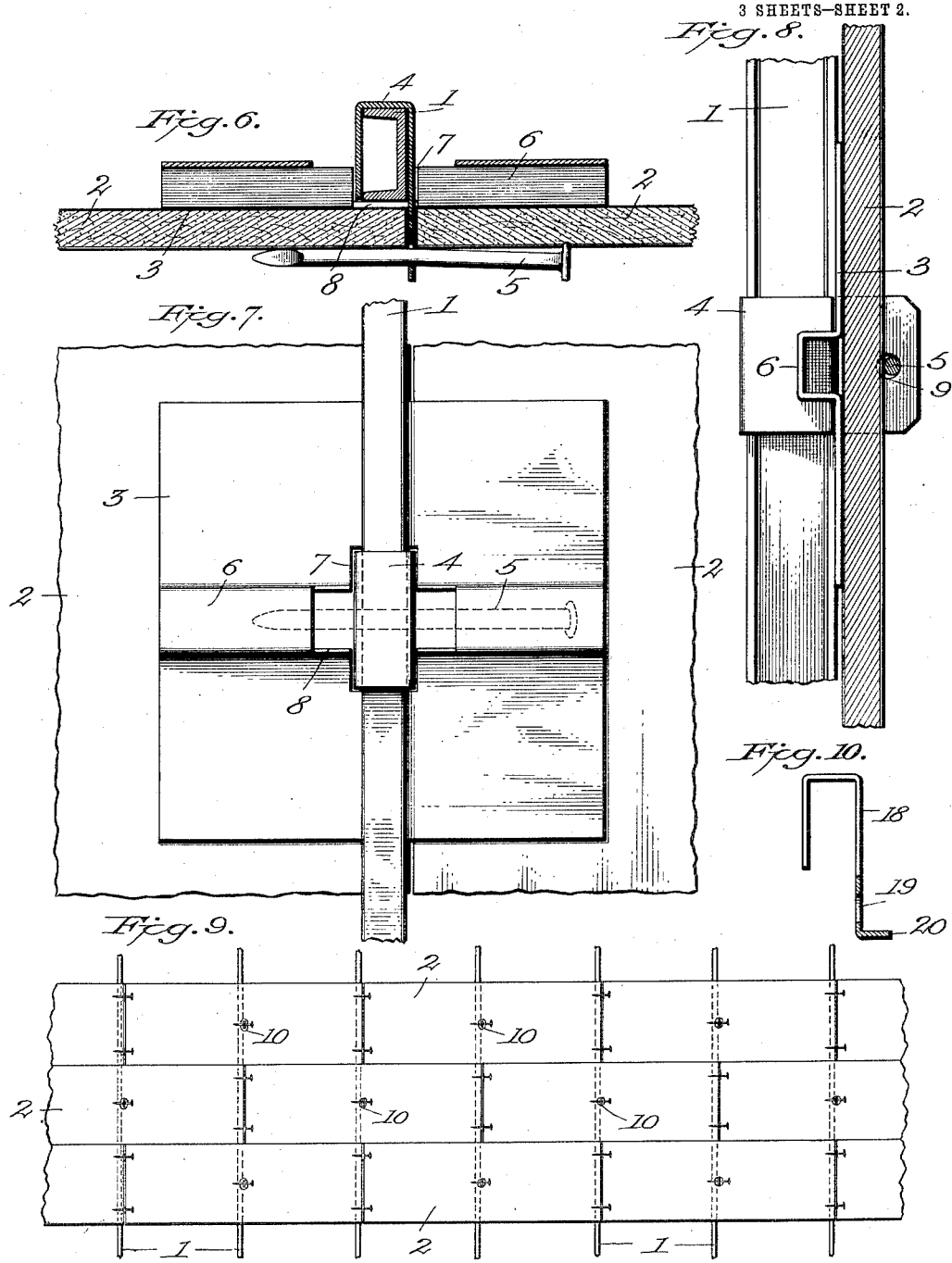

M. H. JESTER.
SUPPORTING DEVICE FOR PLASTER BOARDS USED IN PARTITION CONSTRUCTION.
APPLICATION FILED NOV. 15, 1912.
1,076,766.
Patented Oct. 28, 1913.
3 SHEETS—SHEET 3.
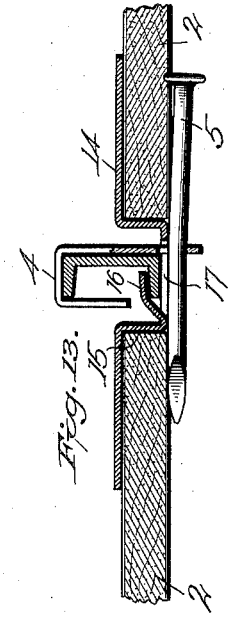
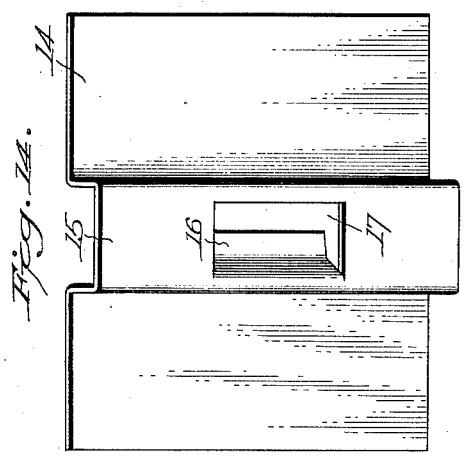
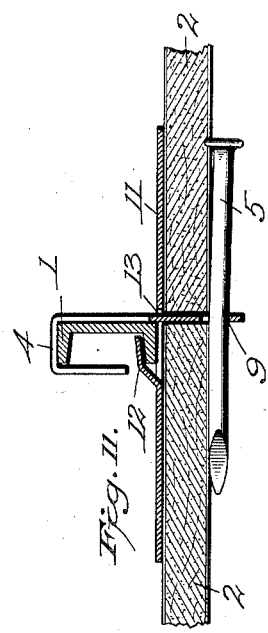
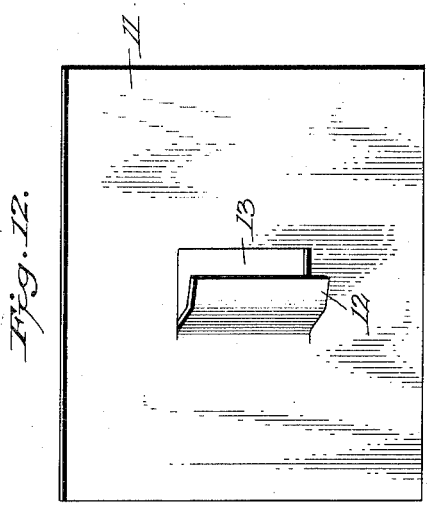

UNITED STATES PATENT OFFICE.

MARVIN H. JESTER, OF DENVER, COLORADO, ASSIGNOR TO THE M. H. JESTER INVESTMENT COMPANY, A CORPORATION OF COLORADO.

SUPPORTING DEVICE FOR PLASTER-BOARDS USED IN PARTITION CONSTRUCTION.

1,076,766.  Specification of Letters Patent.  Patented Oct. 28, 1913.

Application filed November 15, 1912. Serial No. 731,617.

*To all whom it may concern:*

Be it known that I, MARVIN H. JESTER, a citizen of the United States of America, residing in the city and county of Denver and State of Colorado, have invented a new and useful Supporting Device for Plaster-Boards Used in Partition Construction, of which the following is a specification.

This invention relates to improvements in supporting devices for plaster boards used in partition and ceiling construction.

The object of the invention is to provide a clip, which is preferably used in connection with a channel-bar form of studding and which is so arranged that the plaster boards may thereby be secured to the studding so that their adjoining ends will form either a continuous or unbroken vertical joint, or a staggered or broken joint, as may be desired. Further, to provide a clip, comprising an abutment or backing plate and a key-receiving member, which are so constructed that when assembled in one way upon the studding the plaster boards may be secured thereby, so as to form continuous joints along their adjoining ends, and when assembled in another way upon the studding, the plaster boards may be so secured thereby as to form staggered or broken joints. These objects are accomplished by the device illustrated in the accompanying drawings, in which:

Figure 1 is a front view, showing the arrangement of the clip in securing the plaster boards so as to form continuous or unbroken joints along the lines of the studding portions only, of two adjoining plaster boards being shown, and a portion of a stud. Fig. 2 is a horizontal sectional view on the line 2—2 of Fig. 1. Fig. 3 is a rear view of Fig. 1. Fig. 4 is a perspective view of the abutment or backing plate. Fig. 5 is a perspective view of the key-receiving plate. Fig. 6 is a horizontal sectional view, similar to Fig. 2, but showing the part of the clip so assembled that the plaster boards may thereby be secured in a manner to form staggered or broken joints. Fig. 7 is a rear view, similar to Fig. 3, but showing the parts arranged as in Fig. 6. Fig. 8 is an edge view, the parts being arranged as in Fig. 6. Fig. 9 is a front view, showing rows of plaster boards secured to studding in staggered form, or so that the joints of the alternate rows are in the same vertical line. Fig. 10 is an edge view of a slightly modified form of the key-receiving member of the clip. Fig. 11 is a horizontal sectional view of a modification of the clip, showing an arrangement by which the plaster boards may be secured in staggered joint fashion. Fig. 12 is a perspective view of the abutment plate shown in Fig. 11. Fig. 13 is a horizontal sectional view showing a further modification of the clip, showing an arrangement by which the plaster boards are secured so as to form continuous or unbroken joints; and Fig. 14 is a perspective view of the abutment plate forming a part of this clip.

Referring to the accompanying drawings: the numeral 1 indicates a stud, which is preferably in the form of a metal channel bar, these studs in practice being arranged at regular intervals and secured at their opposite ends to the floor and ceiling, respectively.

The plaster boards 2, which are secured to the studding, are a character of board in common use, such boards being of any required length and width and about three-eighths of an inch in thickness. These boards are designed to take the place of the usual laths, and in the present application I have illustrated an improved form of clip for securing these boards to the studding. This clip comprises an abutment plate 3, a coöperating key-receiving member 4, and a key or wedge 5. The plate 3 is a rectangular plate of suitable dimensions, which is bent or pressed to form therein a central longitudinal channel 6, which is U-shaped in cross-section, and of slightly greater width than the depth of a stud or channel bar, while the depth of the said channel is slightly less than the thickness of a plaster board. This U-shaped channel 6 is divided centrally by a transverse slot 7, which also extends through the plate and is greater length than the width of the channel, so that it extends into the plate a suitable distance on each side of the channel. A slot 8 of the same length as the slot 7, is also cut in the bottom of channel intersecting the slot 7, so that the opening through the plate and channel is cruciform in outline, as will be clearly seen by reference to Fig. 7. The key-receiving plate 4 is a U-shaped plate, one side of which is equal in length to the width of one of the studs, while the other side is slightly longer, and is provided with an aperture 9, adjacent to its outer end.

The arrangement of the clip shown by Figs. 1 to 3 inclusive, provides for the attachment of plaster boards in such manner that their adjoining ends form continuous or unbroken joints throughout the length of the studs, and the arrangement is as follows: The key-receiving U plates 4 are first placed upon the channel bars or studs, as shown by Fig. 2. These plates are made to fit the studs snugly, and it is preferable to press their sides slightly toward each other so that they may be sprung upon the studs and thus held by frictional engagement. The plates 3 are then placed upon the opposite sides of the studs 1, their channels 6 engaging the studs and sides of the U-plate as shown, and the longer sides of the U-plate projecting through the slots 8 in the said channels 6. The plaster boards are then placed against the plates 3, with their opposing ends abutting against opposite sides of the channel bars or studs 1, and as the channels 6 are of less depth than the thickness of the plaster boards, the outer surfaces of the said boards will extend slightly beyond the adjacent edges of the studs, as clearly shown by Fig. 2. The holes 9 in the projecting sides of the U-plates are so positioned relatively to the thickness of the plaster boards that they are partially covered by the ends of the said boards, for a reason to be hereinafter explained. The opposing ends of the boards thus placed are then clamped to the studs in the following manner: Keys or wedges 5, are used for this purpose, and these wedges are preferably wire nails of suitable size, which are driven through the holes 9 of the projecting sides of the U-plates 4 and in engagement with the ends of the plaster boards. The holes 9 are of slightly greater diameter than the nails 5, and as above stated, they are partially covered by the ends of the plaster boards. The space between the surface of the plaster boards and the outer margins of these holes is slightly less than the thickness or diameter of the nails, so that when the nails are driven through the said holes, the boards are thereby clamped against the plates 3, the U-plates 4 being held stationary by reason of their engagement with the studs.

In Figs. 6 to 9 inclusive, the arrangement of the clips is such that the boards can be secured so that their opposing ends will form continuous or unbroken joints if desired, or they can also be secured in stagger sired, or they can also be secured in stagger joint form, as shown by Fig. 9. In this arrangement of the clip, the plates 3 are placed upon the studs in positions at right angles to the positions they occupy in the previous arrangement, or so that the studs pass through the slots 7, which divide the channels 6, and rest against the surface of the plates, as shown most clearly by Figs. 7 and 8. The U-plates 4 are then placed upon the opposite sides of the studs from the plates 3, with their sides projecting through the dividing slot 7 of the channel 6, the longer ends of the said U-plates also extending through and beyond the plate 3. The plaster boards are then placed against the plates 3, their opposing ends being separated only by the projecting sides of the U-plates, as shown by Figs. 6 and 9, and are clamped to the said plates by the wedges or nails 5, in the manner previously described. The joints are broken by having the adjoining ends of each alternate row of boards in the same vertical line, as will be understood by reference to Fig. 9. The boards may be secured to the studs intermediate of their ends, by punching holes through them, as shown at 10, through which extend the nail-receiving ends of U-plates 4, which engage the studs at these points. Nails are driven through the holes in the projecting ends of plates, as shown, thus securing the boards at their centers, as well as at their ends. The U-plates only, are used in securing the boards, at their centers, the plates 3 being dispensed with, there being no need for them, as the boards rest directly against the studs and are clamped to them.

In Figs. 11 and 12 is illustrated a modification of the clips in which the same style of U-plate 4 is employed, but in coöperation with an abutment plate 11, which is a flat plate having a tongue 12, projecting from its central portion and which is integrally connected at one end to the plate as shown. This tongue is bent up at an angle to the plate and then over substantially parallel with it, so as to form a hook which is adapted to engage one side of a channel form of stud, as shown. After the plate 11 has been attached to the stud, the U-plate 4 is hooked upon the opposite side of the stud, and its long member passed through the opening 13 in the plate, which is made by removing the metal to form the tongue. The plaster boards are then placed in position with their adjoining ends resting upon the plates 11, and are clamped thereto by the nails 5, in the manner previously described. This clip provides for securing the boards with either continuous or staggered joints, as may be desired.

In Figs. 13 and 14, a further modification of the clip is shown, the clip in this instance being adapted for the securing of plaster boards with continuous or unbroken joints only. In this modification the same style of U-plate 4 is employed as in the other arrangements, but in connection with an abutment plate 14, having a central longitudinal channel 15, from the bottom of which is cut a tongue 16, which is integrally connected to the channel at one end, leaving an opening 17 in the bottom of the channel, as shown. This tongue 16 engages the side of the stud in the same manner as the tongue 12 in Fig. 11, and a U-plate 4 is hooked over the opposite side of the stud, its long member extending through the opening 17. The channel 15 is of slightly less depth than the thickness of the plaster boards and the plaster boards are placed in position with their ends resting upon the plates and abutting against the sides of the channel 15. The key 5 is driven through the aperture in the end of the projecting member of the U-plate, and thereby clamps the ends of the plaster boards to the plates, as in the manner previously described.

In Fig. 10 is shown a U-plate 18, having a key-receiving aperture 19. The extremity of the apertured end of this clip is bent at right angles to form a rest 20, which is adapted to temporarily support one end of a plaster board when the clip is used in ceiling construction.

The clip herein described is not only convertible, so as to adapt it either for staggered or straight joint construction, but its construction is such that by its employment, partitions having the least practicable thickness may be built.

Having described my invention, what I claim as new and desire to secure by Letters Patent, is:

1. The combination with a stud, of a convertible clip for securing plaster boards thereto, comprising an abutment plate having a central longitudinal channel, and a cruciform opening extending through said plate and channel, a U-plate having one member of greater length than the other and provided with an aperture in its extremity, and a key which passes through said aperture, the channel of said abutment plate being adapted to engage one side of said stud in one adaptation, and the stud passing through the slot in its channel when the plate is turned at right-angles, the U-plate engaging the opposite side of the stud with its key receiving end passing through the plate, the key being passed through the apertured end of said plate to clamp the ends of the plaster board to said plate.

2. A clip for clamping plaster boards to studs, comprising an abutment plate formed with a longitudinal channel, and having a cruciform opening extending through the said channel and plate, a coöperating stud-engaging U-plate one member of which is longer than the other and is apertured in its outer end, said apertured end passing through the opening in the plate, and a key which passes through the apertured end.

3. In a clip for plaster boards as specified, the combination with a stud, of a centrally channeled abutment-plate, which engages one side of said stud, having a central cruciform opening, a U-plate engaging the opposite side of the stud, one member of which extends through the opening in the abutment plate and is apertured in its extremity, and a key which is passed through said apertured extremity to clamp plaster boards to the abutment plate, said abutment plate being adapted to engage the stud in positions at right angles to each other to change the plane of its face with respect to the adjacent side of the stud.

4. In a clip as specified, the combination with a stud, of an abutment plate having integral means for engaging one side of said stud, and a central opening, a U-plate engaging the other side of the stud and having one of its members extending through the opening in said abutment plate and provided with an aperture in its extremity, and a nail which passes through said aperture, to clamp material between itself and the abutment plate.

5. In a clip for plaster boards as specified, the combination with a stud, of an abutment comprising a plate formed with a longitudinal channel and having a cruciform opening extending through the channel and plate, said plate being placed upon the stud with its channel engaging the same when it is desired to position the plate back of the front face of the stud, or turned at right angles to allow the stud to pass through the slot which divides its channel when it is desired to have the plate rest against the stud, a U-plate engaging the opposite side of the stud, one member of which extends through the opening in the plate and is apertured, and a member which is passed through said aperture, to clamp the ends of plaster board to the abutment plate.

6. A clamping device for plaster-boards comprising a stud, an apertured abutment-plate having a channel into which said stud fits, a clip-plate having a portion engaging said stud and having a leg extending through the aperture of said abutment-plate, said extended leg having a key-way in approximate alinement with the surface of the plaster-boards, and a key adapted to be forced into said key-way to maintain the plaster-boards against said abutment-plate.

7. A clamping device for plaster-boards comprising a stud, an apertured abutment-plate having a channel adapted to engage said stud, a U-plate arranged to engage said stud and having one of its legs extending through the aperture of said abutment-plate, said extended leg having a key-way in approximate alinement with the surface of the plaster-boards, and a key adapted to be forced through said key-way to maintain the plaster-boards against said abutment-plate.

In testimony whereof I affix my signature in presence of two witnesses.

MARVIN H. JESTER.

Witnesses:
  G. SARGENT ELLIOTT,
  ELIZABETH SMITH,